Figure 1:
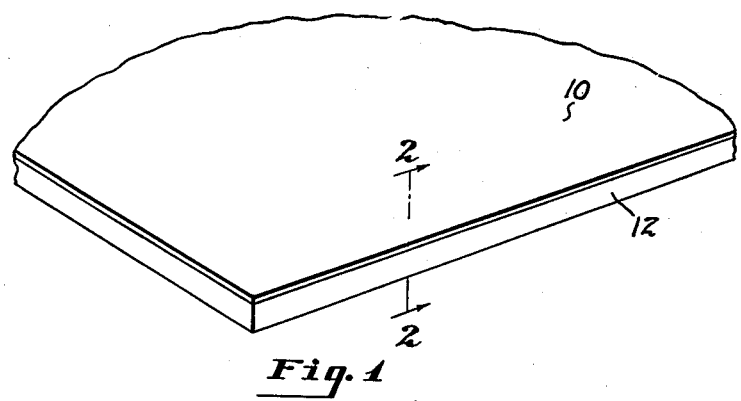

Feb. 26, 1963 H. UELZMANN 3,079,358
AQUEOUS SOLUTION OF ZIRCONYL SALTS OF CARBOXYL
POLYMER AND SUBSTRATE COATED WITH SAME
Filed Sept. 30, 1959

INVENTOR
*Heinz Uelzmann*

BY *McCoy, Greene & TeGrotenhuis*
ATTORNEYS

United States Patent Office 3,079,358
Patented Feb. 26, 1963

3,079,358
AQUEOUS SOLUTION OF ZIRCONYL SALTS OF CARBOXYL POLYMER AND SUBSTRATE COATED WITH SAME
Heinz Uelzmann, Akron, Ohio, assignor to The General Tire & Rubber Company, Akron, Ohio, a corporation of Ohio
Filed Sept. 30, 1959, Ser. No. 843,535
23 Claims. (Cl. 260—29.7)

This invention relates to compositions of stabilized aqueous solutions of COOH containing copolymers, to films and coated articles obtained from such solutions and to methods of making the same.

Aqueous solutions of polymeric materials such as aqueous solutions of polyacrylic and polymethacrylic acids are known. These polymers are prepared generally in an acidic system. The latex obtained then is treated with a crosslinking material such as zirconium hydrate, ammonium carbonate and sufficient base such as ammonium hydroxide to dissolve the latex or aqueous dispersion of polymer. The solution is cast and on drying the zirconium serves to crosslink the polymer to form a film. While these films are somewhat resistant to water, they do not have sufficient hardness and flexibility to permit them to be used generally. The flexibility, stability, and adhesion of polyacrylic acid films can be improved by the addition of acrylates like methyl acrylate etc. Their hardness can be improved by copolymerizing the acrylic acids with methyl methacrylate, tertbutylacrylamide, styrene and the like. However, films of these copolymers cannot be obtained from a solution but only in the form of latex since, due to the substantial amount of hydrophobic monomeric units present, the resulting copolymer precipitates from solution on the addition of the crosslinking agent. Large amounts of emulsifying agents do not satisfactorily solve this problem and, further, introduce unwanted properties into the film. Moreover, while latices or aqueous dispersions of polymeric materials have many uses, they have limitations in the amount of pigmentation that can be used, are unstable in that they are subject to coagulation of precipitation on freezing and thawing, and are sometimes subject to agglomeration when grinding with fillers and pigments.

It, thus, would be highly desirable to avoid the difficulties alluded to in the prior art and to obtain water soluble compositions of polyners containing the —COOH group and which are stable, have a high filler or pigment pickup and can be mixed with fillers, pigments and the like by grinding and other techniques without agglomerating and which provide hard and flexible films.

Acordingly, it is a primary object of the present invention to provide a composition of an aqueous solution of a polymer containing the —COOH group(s) and which has a high pigment take-up, can be frozen and thawed without coagulation or precipitation, and can be mixed with pigments by grinding without agglomeration, and which provides water resistant, hard and flexible films.

It is another object of the present invention to provide a method for making compositions of a stable aqueous solution of polymers containing a —COOH group and containing a crosslinking agent and which can be dried to provide relatively flexible and hard films, sheets and coatings on base materials.

A further object is to provide a film, sheet or substrate having a coating of a stabilized carboxylic polymer exhibiting good flexibility and hardness as well as resistance to water and the like.

A still further object is to provide a method of producing a substrate with a coating of a polycarboxylic type material which is water resistant, hard and flexible.

Figure 2:
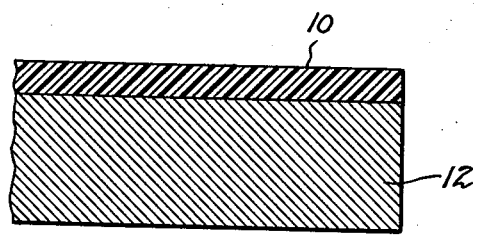

These and other objects and advantages of the present invention will become more apparent to those skilled in the art from the following detailed description, examples and drawing in which FIGURE 1 is a perspective view of an article containing a coating of the present invention in which the coating 10 comprises a copolymer deposited from the composition of the present invention and which has been air dried and crosslinked and the base 12 comprises a metallic member, sheet or plate. FIGURE 2 is a view along the line 2—2 of FIGURE 1.

It has been discovered according to the present invention that the addition of a minor amount by weight, based on the weight of the ammonium and/or amine salt of —COOH containing copolymer (which has a substantial amount of hydrophobic monomeric units as compared to hydrophylic monomeric units), of a material of the group of amides and hydrazides, for example, urea, to an aqueous solution of the ammonium or amine salt of said copolymer, will serve to stabilize said copolymer on the addition of a crosslinking agent.

The copolymer does not coagulate nor precipitate on addition of the crosslinking agent. The resulting solutions can be repeatedly frozen and thawed without coagulation or precipitation; they can be ground with finely divided fillers and pigments without agglomeration; they form on air drying flexible, hard and light stable films which are water resistant; and they can take up or absorb up to 20% more filler or pigment than the corresponding latex type polymer or copolymer compositions. The compositions of this invention can, further, be stored for extended periods of time without precipitation or coagulation.

The copolymer is prepared in the normal way as a latex by emulsion polymerization of the monomers in conjunction with a catalyst, a chain transfer agent, etc. Many type of aqueous polymerization systems can be used such as those employing potassium peroxydisulphate, a reducing agent, and an emulsifier. Another example would be hydrogen peroxide, $Na_4P_2O_7 \cdot 10H_2O$, $Fe_2(SO_4)_3$, and soap flakes as well as other well known emulsion polymerization systems can be used. Known modifiers can be used to adjust the molecular weight such as xanthogenates, disulfides, sulfides, mercaptans, etc. While emulsion polymerization systems are more convenient, the copolymer can be prepared by suspension polymerization, in bulk or mass or by solvent polymerization. When using the latter systems, the polymer obtained is then converted to the latex form and/or to an aqueous solution and treated as disclosed herein to stabilize the same. It is preferred to polymerize in an emulsion under acid conditions.

The hydrophilic monomer of the copolymer can be any acid containing monomer like itaconic acid, maleic acid, fumaric acid, acrylic acid, methacrylic acid, ethacrylic acid, hexacrylic acid, octacrylic acid or any other acid monomer or mixture of monomers of a monoolefinic material having from 1 to 2 COOH groups. The preferred monomer has the formula

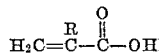

where R is selected from the group consisting of hydrogen and an alkyl radical of from 1 to 8 carbon atoms. The hydrophobic monomer or material can be an alkyl acrylate, such as methylacrylate, ethylacrylate, butylacrylate, ethyl hexyl acrylate, hexyl acrylate, octyacrylate, methylmethacrylate, ethylmethacrylate, or butadiene, dimethyl butadiene, chloroprene, isoprene, isobutylene, methyl vinyl ketone, methyl isopropenyl ketone, vinyl acetate, methacrylamide, terbutyl acrylamide, styrene, alphamethyl styrene, chlorostyrene, acrylonitrile, alpha methyl acrylonitrile, vinyl pyridine, chloroacrylonitrile and the like. Hydrophobic natural or synthetic rubbers or resins such as natural rubber, cispolybutadiene, rubbery butadiene-styrene copolymers, rubbery butadiene-acrylonitrile copolymers, styrene-acrylonitrile copolymers, high styrene-butadiene copolymers, polychloroprene, etc., considered as copolymerizable, can be grafted with one or more of the acid containing hydrophilic monomers and also can be employed in the practice of the present invention. Mixtures of these materials can be used.

Of the hydrophilic monomers disclosed above it is preferred to use acrylic acid or methacrylic acid (which is even more preferred) or mixtures thereof, and of the hydrophobic monomers it is preferred to use at least one monomer of the group of ethylacrylate, methylacrylate, methylmethacrylate, ethyl ethacrylate, butyl methacrylate or other acrylic acid ester in which the alpha carbon atom contains hydrogen, a methyl or ethyl radical and in which the alkyl group has from 1 to 8 carbon atoms. Mixtures of these acrylates can be used.

The acid monomers are used in the copolymer in an amount of from about 1 to 50 mole percent and the hydrophobic type monomer or material is used in the copolymer in an amount of from about 50 to 99 mole percent. Alternatively, where graft or other polymers are made, the acid monomer should constitute from about 1 to 50 mole percent of the (co)polymer. By copolymer is meant copolymers of 2 or more monomers or copolymers of 1 or more monomers with at least one (co)polymer, natural or synthetic (a graft polymer, for example). It is preferred that the polymers contain from about 4 to 20 percent by weight of the acid type monomer with the balance being the hydrophobic type monomer. The monomers are polymerized as discussed above to provide a latex of various solids content, usually from 20 to 70% solids although the solids content can readily be adjusted with more or less water. Preferably, the solids will run from about 25 to 55%.

The resulting copolymer has an average molecular weight of from about 5,000 to 100,000. However, it is preferred to use a copolymer having an average molecular weight of from about 10,000 to 30,000 to provide the best viscosity and high solids content with ease of handling although the molecular weight can vary somewhat as indicated without substantially detracting from the desired results. The polymerization can be carried to substantially complete conversion, that is, up to about 90 to 100 percent.

After the latex has been obtained, it is then treated with ammonia, ammonium hydroxide or a water soluble amine or mixture thereof to convert the latex into a soluble ammonium or amine salt. Sufficient ammonia and the like should be added to obtain the soluble salt or to dissolve the latex. The pH of the resulting solution of the polymer can vary from about 5 to 9. At the higher pH content the viscosity of the solution is higher. If the pH is less than 5 or greater than 9, coagulation will occur on addition of the crosslinking agent, complete dissolution of the polymer will not be obtained or the solution will be too viscous to handle. Examples of suitable amines are methyl amine, ethyl amine, dimethyl amine, diethylamine, isobutylamine, propylamine, isopropylamine, and other low molecular weight alkyl amines, etc., and mixtures thereof. The amine should have a boiling point not greater than about 70° C. and/or a relatively high vapor pressure so that on air drying or by similar means of removing the water present such as by using a heated gas, etc., the amine is substantially entirely removed from the composition. Other ways (such as by use of a vacuum) to remove $H_2O$, $NH_3$ or amines are useful.

The amide or hydrazide which is added to the solution can be urea, biurea, thiourea, formamide, carbohydrazide, semicarbazide, and other water soluble amides or hydrazides and mixtures thereof which preferably have a high stabilizing effect. In place of the amide or hydrazide glycine can be used. A sufficient amount of the amide or hydrazide is added to stabilize the polymeric solution or to stabilize the polymer in the presence of the crosslinking agent. In general, from about 5 to 45 parts by weight of the amide or hydrazide per 100 parts by weight of the polymeric material (the ammonium and/or amine salt of the copolymer) is added to the solution of the copolymer. Very large amounts of the amide or hydrazide are not desired since they tend to reduce the water resistance of the coatings although amounts larger than 45% may be needed where the amide or hydrazide is not relatively active or has insufficient amide hydrogen atoms. Since the stabilizing effect of these materials depends on the concentration of the ammonia and the crosslinking agent, high pH's such as those up to 9 will require larger amounts of the stabilizing materials. Of the materials shown, it is preferred to use urea because it has four available amide hydrogen atoms and is highly water soluble. On the other hand when amino alcohols, amines and amino nitriles were used in place of the urea etc., the copolymer precipitated partially or entirely from the solution in the presence of the crosslinking agent.

After the addition of the amide or hydrazide to the polymeric solution, the zirconyl crosslinking agent is added thereto. Sufficient crosslinking agent should be added for all of the carboxyl groups of the polymer. Some excess may be employed to insure that all of the carboxyl groups are reacted, stabilized or complexed and all of the available valences of the zirconium are reacted. In general there should at least be sufficient Zr to provide from 2 to 4 Zr valence links for every two to four COOH groups in the copolymer(s). The zirconyl crosslinking agent is an ammonium or amino zirconyl salt of a carboxylic acid. The crosslinking agent has the general formula $(NHR_1R_2R_3)_x(HZrO)(A)_y$ where $R_1$, $R_2$ and $R_3$ are hydrogen or a lower molecular weight alkyl radical such a smethyl, ethyl, propyl, isopropyl, butyl, amyl, and the like. A is the residue of a carboxylic acid like carbonate or carbonic acid, formic acid, acetic acid, glycolic acid, propionic acid, lactic acid, butyric acid, alpha hydroxy butyric acid, alpha hydroxy caproic acid, mandelic acid and so forth. $x$ and $y$ are numbers which can vary from .5 to 10 depending on the relative ratios of the ammonium (amino) and acid residue radicals desired. Preferably, the crosslinking agent is ammonium zirconyl carbonate having the formulae $$(NH_4)_3HZrO(CO_3)$$

$(NH_4)_{4.6}HZrO(CO_3)_{4.2}$ or other formulae in which the ratios of the radicals may vary somewhat. On the other hand when zirconium acetate, zinc oxide, aluminum hydroxide and lead oxyacetate were added to the polymeric solution with or without the amide or hydrazide, the copolymer precipitated in a very short time for the solution or formed a dispersion.

After the amide or hydrazide has been added, the solution containing the Zr salt can be stored indefinitely without any appreciable coagulation or precipitation. The composition can also be frozen and thawed repeatedly without coagulation of the polymeric materials. The aqueous solution will also take up to 20% by volume more filler or pigment than conventional or similar latex compositions. On applying to a porous surface such as cotton cloth, paper, brick, concrete block, wood, porous plastics and the like, the polymer air dries in a few hours at room temperature to form a hard, flexible and tough film which is resistant to water. On smooth non-porous surfaces, such as glass, metals, non porous plastics, the drying time may take several days at room temperature. The time of drying and/or curing can be accelerated by heating above room temperature. However, the resulting film is flexible, hard and water resistant. The stabilized polymeric solution of this invention can also be used as a wetting or dispersing agent and can be added to conventional latex paints to improve their wet edge properties.

While the amide or hydrazide is preferably usually added to the aqueous polymeric solution prior to addition of the zirconium compound, it can be added with the ammonia or amine or mixed with the zirconium compound. Moreover, the polymer can be precipitated with the zirconium compound and then redissolved with the amide or hydrazide. However, this latter procedure is less desirable and somewhat bothersome. It, also, is preferred to add the zirconium compound, ammonia, amines and amide or hydrazide in aqueous solution to obtain better and quicker mixing although they can be added as solids or liquids where they exist as such. It is very desirable to add the amide or hydrazide solution first to the aqueous ammoniacal polymeric solution and then with rapid agitation to add the ammonium zirconyl carbonate solution.

Compounding ingredients such as fillers, pigments etc. are readily added to the polymeric solutions of the present invention. The amounts to use will vary as to the type of paint ultimately desired, as to the viscosity wanted, as to the final use and so forth. In general amounts up to 100% by weight of these materials based on the weight of the copolymer present can be employed although this amount can be somewhat greater or smaller. Examples of useful pigments are finely divided mica, lead oxide, hansa yellow $SiO_2$ containing materials, silicates, $TiO_2$, iron oxide, carbon black, talc, phthalocyanine blue or green, alumina, metallic flakes or particles, barytes, lithopone, and fibrous fillers such as glass, wood cellulose, nylon, asbestos, wool, Dacron, rayon fibers and the like. Other materials can be added such as antioxidants, antiozonants or other antidegradants, fungicides, herbicides, plasticizers such as tributyl phosphate, pine oil, deodorants, formaldehyderesorcinol or phenol resoles, antimony trioxide or other fire resistant material, ultra violet light absorbers when needed, and so forth. Where the copolymer contains a diene or unsaturated group, accelerators and curing agents such as sulfur, zinc oxide, zinc stearate, benzothiazyl disulfide etc. can be used. Rubber and/or resinous latices can also be added. The solid fillers and pigments may also be surface treated with isocyanates, silicones, polyhydric alcohols and the like to change their properties.

It is not precisely known what occurs in the practice of this invention, but it is believed that the results obtained are due to the formation of a stable complex between the amide and/or hydrazide and the ammonium zirconyl carbonate and polymer. For example, in the case of pure polyacrylic acid almost any Zr-salt can be used when it is stabilized by adding ammonium carbonate to form a soluble complex. But this principle works only because every monomer-unit in the polyacrylic acid is hydrophilic, a 100% polyelectrolyte. The copolymers of the present invention, however, contain large amounts of hydrophobic monomers and the incorporation of Zr-salts causes immediate precipitation. The addition of ammonium carbonate to the copolymer solution does not stabilize it but precipitates the copolymer completely. Even the ammonium-zirconyl carbonate complex causes precipitation and is compatible only when used in very small amounts or in highly diluted solutions, both undesirable measures. Apparently the ammonium carbonate precipitates the copolymer because of its ionized state (salt-nature) causing incompatibility with the hydrophobic polymer chains. The additional use of an emulsifier like Santomerse S (an alkyl aryl sulfonate) increases stability but not satisfactorily. Another emulsifier such as Tergitol does not work.

On the other hand when an amide or hydrazide such as urea is used it forms a stable complex with the zirconium salt and polymer, but causes no precipitation of the copolymer. The stabilizing effect of the urea seems to be due to its amide-hydrogen, in the presence of the acid components of the polymer, forming a complex with Zr. Urea is a compound which is not ionized but has enough amide-hydrogen available to form a complex. Precipitates of the polymer-zirconium salts disappear at once when urea is added. Urea apparently prevents the copolymer from becoming deionized for when the copolymer is deionized, it precipitates. The water soluble copolymer in its ionized state cannot lose nor exchange its electric charges nor, also, agglomerate as latex particles do. Thus, no precipitation takes place when the copolymeric solutions or paint compositions of the present invention are exposed to very low temperatures and then thawed.

After drying and aging, polyvalent zirconium reacts with several carboxyl groups, the complex decomposes, and the crosslinks insolubilize the copolymer, simultaneously increasing its molecular weight. The carboxyl groups, which in the aqueous phase, had been ionized in connection with the Zr-complex become de-ionized after drying and dehydration with loss of ammonia or the amine.

The drying speed of the solution largely depends on the removal of water. This dehydration process is completely different compared with that of a latex. In latex the polymer particles are surrounded by water particles so that the water contains a completely hydrophobic phase. The solution copolymer, however, has its carboxyl groups on the chains completely hydrated and every chain is separated from the other by a water phase so that there is essentially no separate hydrophobic phase but only one hydrophilic phase. The time of dehydration of the solution polymer is longer than in case of latex and the mechanism of dehydration is different, too. Applied on a non-permeable surface (glass) the latex particles allow the water from the lower layers to pass between and evaporate from the surface. In case of the solution-copolymer a continuous film is formed, which apparently becomes first crosslinked on the surface because of evaporation, thus sealing the film and making it somewhat harder for the water on the bottom to penetrate and evaporate. Another factor, the stronger association of water molecules to the polar groups of the polymer chains, also contributes to the longer drying process. However, when these solution-polymers are applied on porous surfaces, like green wood, paper board, plaster or brick, the penetration and absorption is extremely fast and the polymer surface is so much extended that the diffusion and evaporation of the water is completed within a few hours. The porous surface leaves a high concentration of pigments, especially when only one coat is supplied. This sealing effect inside the material to be painted is useful in exterior painting, preventing blistering of the top coating. The second coating can be the water soluble copolymer or a mixture of the water soluble copolymer and a latex, the latter providing more sealing on the top surface. In one experiment a TiO$_2$-pigmented copolymer solution of the present invention was applied on wood and paper board. Water resistance was good after 2 to 3 days of air-drying. The copolymer solutions of the present invention are also useful additives to latex paints to penetrate the chalk, etc. on old surfaces. They also are useful as a wet edge additive (to prevent brush marks showing on overlapping) for paints and as an additive to promote slow drying.

The flow properties of these paints are surprisingly good. Excellent (fast and complete) leveling is observed, leaving no brush marks. No sensitivity to grinding as well as freezing and thawing is found. After thawing samples kept at −20° for 4 days, no coagulation was noticed and the application properties were still unchanged. The present polymeric solutions are insensitive to substantial pigmentation, to freezing and thawing, to long-time storage and grinding. The low surface tension of the aqueous copolymer solutions (32 to 36 dynes/cm.) makes them useful as wetting agents particularly in emulsion polymerization of dienes and unsaturates such as butadiene and styrene. But the main reason for these results is believed to be maintenance of the ionized state of the polymer chains which prevents precipitation by use of the amide or hydrazide.

Furthermore, the high binding efficiency of the aqueous copolymer solutions of the present invention allows about a 20% higher pigmentation of paints made thereof without precipitating the binder as is the case with latex paints when over pigmented. The polymer-zirconium-urea-complex has a special stabilizing effect on the pigment particles yielding paints which do not show sagging after weeks of storage, not even with heavy pigments like iron oxide. Apparently, the dissolved hydrated copolymer of the present invention surrounds pigment particles completely and at the same time affords a wetting and adhesion effect to their surface. More pigment particles have contact with the copolymer. This way binding efficiency is increased. In this fashion increased amounts of pigments can be added to the water solution of the copolymer as compared to a latex. Precipitation of the copolymer does not occur because it is ionized itself. On the other hand latex particles are only stabilized by ion-absorption and after losing or exchanging their electric charges, the latex precipitates easily. The increased pigment concentration and binding efficiency of the copolymer solutions of the present invention means much better binding power (one-coat painting) or a saving in the amount of copolymer used. Moreover, the copolymer solutions can readily compete with less expensive materials since less of it is needed to obtain the same binding efficiency. The viscosity of the copolymeric solution can be changed readily by the addition of ammonia and/or amines so that the additional use of thickening agents is not required.

The following examples will serve to illustrate the invention more particularly to those skilled in the art:

EXAMPLE I

An aqueous latex of a copolymer of about 60% ethylacrylate, 30% methyl methacrylate, 5% acrylic acid and 5% methacrylic acid (percent by weight) was treated with 50 cc. of concentrated ammonia and 390 cc. of water to dissolve the latex and obtain a solution of about 30% solids having a very low viscosity (130 cp.) and a pH of 5.5 to 6. The copolymer had a molecular weight of 10,000 to 30,000. When more ammonia was added to give a pH of 8.0 to 8.5, the viscosity obtained was about 1800 cp.

100 grams of the above 30% low viscosity solution of the copolymer were mixed with 14 grams of a 50% solution of urea, 14 grams of a 35% solution of ammonium zirconyl carbonate, 20 grams of water, 30 grams of Fe$_2$O$_3$, 5 grams of mica and 15 grams of titanium oxide, plus 100 grams of Rhoplex 33 (an ethyl acrylate polymeric emulsion made by the Rohm and Haas Company) without agglomeration. The resulting paint composition contained about 46% solids, and of this amount about 45% represented the concentration of pigment. This concentration was about 18% more than that possible with a latex of the same copolymer. This paint composition was painted on a steel plate and dried. The painted surface was then brushed with a brush dipped in water 4,000 times and again with the same brush dipped in a 5% soap solution for 10,000 times without any apparent physical damage except a loss of gloss.

A similar paint composition was used except that it contained 10 g. H$_2$O instead of 20 g. The ingredients were mixed in a pebble mill and the resulting paint was painted on a H$_3$PO$_4$ treated steel panel and pre-dried for 20 min. at 60° C. Then the painted panel was baked at 320 to 350° F. for 30 minutes. The impact strength of this paint film or coating was outstanding as it withstood 80 inch/lbs. impact without any loss of adhesion or damage (cracking) to the film. On bending the steel panel through 180 degrees the adhesion was not lost and no cracks appeared.

Samples of the above paint solutions (pH 5.5–6) were frozen at −20° C. and thawed for 20 cycles without any evidence of coagulation or precipitation.

EXAMPLE II

An aqueous latex of a low molecular weight (10,000–30,000) copolymer of about 81.4% (by weight) ethylacrylate, 2.5% methacrylamide, 8.5% acrylic acid and 8.5% methacrylic acid was neutralized with ammonium hydroxide to obtain a solution of 50% solids. The solution was then diluted to 25% solids, and to 200 grams of this solution were added 28 grams of a 50% urea solution and 28 grams ammonium zirconyl carbonate (50%) solution. To 100 grams of this stabilized clear solution was added 100 grams of an aqueous pigment dispersion containing 50% solids. The resulting paint had a viscosity of from 1,000 to 9,000 cp., exhibited good adhesion, was hard, had good leveling properties and showed no brush marks.

EXAMPLE III

To 10 g. of the solution (30% solids) of Example I, above, in which the polymer was dissolved in ammonia and having a pH of 5.5 to 6 was added 1.5 grams of ammonium zirconyl carbonate (35% solution). The polymer immediately precipitated from the solution which had a pH of 9 to 10. However, when 4 cc. of urea solution (50% solids) was added the precipitate dissolved in the solution. When the same procedure was repeated except that 6 cc. of formamide solution (saturated) was added in place of the urea, the precipitate dissolved. Moreover, when 4 cc. of thiourea solution (saturated) was added to the precipitate in place of the urea, the precipitate disappeared, the viscosity of the solution increased and the solution became clear. On the other hand when 8 cc. of 50% solution of ammonium isothiocyanate was used instead of urea, the precipitate did not disappear. This example shows the importance of using an amide or hydrazide in the practice of the present invention.

Still other latices were dissolved in ammonia and treated with urea and ammonium zirconyl carbonate solutions to give stable solutions which, when applied as coatings, gave water resistant, flexible, and hard films. Solutions of these copolymers having average molecular weights of about 10,000 to 30,000 did not coagulate on freezing and thawing, could be highly pigmented and did not agglomerate on grinding. Examples of the monomers used in making the resulting copolymers are disclosed in Table A below:

Table A
COMPOSITION OF COPOLYMERS USED FOR AIRCURING HYDROPHILIC BINDERS

| | Composition, percent by weight | | | | | | | | | | | | | | | | |
|---|---|---|---|---|---|---|---|---|---|---|---|---|---|---|---|---|---|
| Acrylic acid | 10 | 10 | 10 | 10 | 6 | 6 | 5 | 5 | 6 | 6 | --- | 25 | 5 | 7 | --- | 5 | 5 |
| Methacrylic acid | 10 | --- | --- | --- | 6 | 6 | 5 | 5 | 6 | 6 | 25 | 25 | 5 | 7 | 10 | 5 | 5 |
| Ethylacrylate | 80 | 90 | 80 | 76.7 | 73 | 75 | 78 | 78 | 68 | 78 | 75 | 50 | 80 | --- | 60 | --- | --- |
| Methylacrylate | | | | | | | | | | | | | | | | | |
| n-Octylacrylate | | | | | | | | | | | | | | 86 | 30 | | |
| Methyl methacrylate | | | | | | | | | | | | | | | | 60 | |
| Ethyl methacrylate | | | | | | | | | 20 | | | | | | | 30 | 90 |
| Tert. butylacrylamide [1] | | | 10 | 13.3 | 15 | 13 | 12 | --- | | 7 | | | | | | | |
| Methacrylamide | | | | | | | | 5 | | | | | | | | | |
| Acrylonitrile | | | | | | | | | | | | | 10 | | | | |
| Styrene | | | | | | | | | [2] 10 | | | | | | | | |

[1] Can be incorporated up to 15–18%. Higher quantities are insoluble in the monomers.
[2] Should not be used above about 35%.

EXAMPLE IV

A latex of a copolymer (M.W. 10,000–30,000) containing 60% ethyl acrylate, 30% methyl methacrylate, 5% acrylic acid and 5% methacrylic acid (percent by weight) was dissolved and neutralized with ammonia to a pH of about 7 and diluted to a solids content of about 30%. A stabilized solution of the copolymer was then prepared by adding, in the following relative ratios, 16 g. of urea (50% aqueous solution) and 14 g. of ammonium zirconyl carbonate (35% aqueous solution) to 100 g. of the above copolymer solution (30% solids; pH–7).

Separate portions (20 g.) of the above stabilized aqueous solutions (30% solids in water) were then mixed with (A) 20 g. of a latex (30% solids, 100 parts hot polymerized 75/25 butadiene-1,3/styrene copolymer grafted with 30 parts of methyl methacrylate) and with (B) 20 g. of a latex (30% solids, 100 parts hot polymerized 75/25 butadiene-1,3/styrene copolymer grafted with 15 parts of methyl methacrylate). In each case after 4 weeks, there was no phase separation, the viscosity of the resulting composition was low and only a slight residue was observable. Films obtained by drying the resulting compositions were almost clear. Similar results were obtained when (A), above, was substituted by (C) a 30% latex of a graft of 50 parts methyl methacrylate on 100 parts of hot polymerized 75/25 butadiene-1,3/styrene copolymer and by (D) a latex (30% solids) of a 60/40 alpha-methylstyrene-acrylonitrile copolymer. Similar results also, were obtained when a 30% latex of a copolymer of 75/25 butadiene-1,3 and methyl isopropenyl ketone was substituted for (A) above.

These results clearly show that stabilized solutions of the copolymer are compatible with latices and will provide stable compositions which can be used to make useful films.

EXAMPLE V 100 grams of the solubilized copolymeric solution (30% solids) of Example IV, above, was mixed overnight in a ball mill with 200 grams of a 30% solids latex of 100 parts of hot polymerized 75/25 butadiene-1,3/styrene copolymer grafted with 50 parts of methyl methacrylate, 44 g. of $Fe_2O_3$, 11 g. of mica, and 88 g. of aluminum silicate pigment. The resulting composition was then painted on a $H_3PO_4$ treated steel panel, pre-dried at 60° C. for 30 min., and then baked at 320° F. for 45 minutes. The resulting panel withstood an impact of 80 inch/pounds without cracking and could also bend through an arc of 180° without cracking. This example, also, illustrates the compatibility of the stabilized copolymeric solutions of the present invention and that they will form useful coatings with other binders or paints.

It is to be understood that in accordance with the provisions of the patent statutes, the particular form of composition, product or article shown and described and the particular procedures set forth are presented for purposes of explanation and illustration and that various modifications of said composition, product, article and procedure can be made without departing from this invention.

Having thus described the invention, what is claimed is:

1. A composition comprising an aqueous solution having a pH of from about 5 to 9 and of a polymeric material selected from the group consisting of the ammonium and amine salts and mixtures thereof of a copolymer of at least one monoolefinic monomer having from 1 to 2 COOH groups with at least one copolymerizable hydrophobic material selected from the group consisting of polymers and monomers having polymerizable carbon-to-carbon aliphatic double bonds, a crosslinking agent in an amount sufficient to crosslink said copolymer on air drying and being selected from the class consisting of the ammonium and amino zirconyl salts of carboxylic acids free of aliphatic unsaturation, and a monomeric water soluble compound in an amount sufficient to stabilize against coagulation said polymeric material in the presence of said zirconyl compound and being selected from the group consisting of glycine, amides, thiourea and hydrazides, the ratio of the total amount of monoolefinic monomer to the amount of said copolymerizable hydrophobic material being from about 1:99 to 50:50 mole percent and said copolymer having an average molecular weight of from about 5,000 to 100,000.

2. A composition comprising an aqueous solution having a pH from about 5 to 9 and comprising the ammonium salt of a copolymer of from about 4 to 20 parts by weight of methacrylic acid and the balance at least one acrylate having the formula

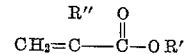

where R' is an alkyl group of from 1 to 8 carbon atoms and R'' is selected from the group consisting of hydrogen, methyl and ethyl radicals, ammonium zirconyl carbonate in an amount sufficient to crosslink said copolymer on air drying, and a monomeric water soluble compound in an amount from about 5 to 45 parts by weight per 100 parts by weight of said ammonium salt of said copolymer and being selected from the group consisting of glycine, amides, thiourea and hydrazides, said copolymer having an average molecular weight of from about 10,000 to 30,000.

3. A composition comprising an aqueous solution according to claim 2 in which said water soluble compound is urea.

4. A composition comprising an aqueous solution according to claim 2 in which said water soluble compound is thiourea.

5. A composition comprising an aqueous solution according to claim 2 in which said water soluble compound is formamide.

6. A composition comprising an aqueous solution according to claim 2 in which said water soluble compound is glycine.

7. A composition comprising an aqueous solution according to claim 2 in which said water soluble compound is carbohydrazide.

8. The method of stabilizing a composition comprising an aqueous solution having a pH of from about 5 to 9 and of a polymeric material selected from the group consisting of the ammonium and amine salts and mixtures thereof of a copolymer of at least one monoolefinic monomer having from 1 to 2 COOH groups with at least one copolymerizable hydrophobic material selected from the group consisting of polymers and monomers having polymerizable carbon-to-carbon aliphatic double bonds to prevent precipitation of said copolymer in the presence of a crosslinking agent, which comprises adding to said aqueous solution a monomeric water soluble compound in an amount sufficient to stabilize against precipitation said polymeric compound in the presence of said crosslinking agent and being selected from the group consisting of glycine, amides, thiourea and hydrazides, and adding a crosslinking agent to said solution in an amount sufficient to crosslink said copolymer on air drying and being selected from the class consisting of the amonium and amino zirconyl salts of carboxylic acids free of aliphatic unsaturation, the ratio of the total amount of said monoolefinic monomer to the total amount of said copolymerizable hydrophobic material in said copolymer being from about 1:99 to 50:50 mole percent and said copolymer having an average molecular weight of from about 5,000 to 100,000.

9. The method according to claim 8 in which said water soluble compound is urea.

10. The method according to claim 8 in which said water soluble compound is thiourea.

11. The method according to claim 8 in which said water soluble compound is formamide.

12. The method according to claim 8 in which said water soluble compound is glycine.

13. The method according to claim 8 in which said water soluble compound is carbohydrazide.

14. A film comprising the reaction product of a water soluble polymeric material selected from the group consisting of (A) the ammonium and amine salts and mixtures thereof of a copolymer of at least one monoolefinic monomer having from 1 to 2 COOH groups with at least one copolymerizable hydrophobic material selected from the group consisting of polymers and monomers having polymerizable carbon-to-carbon aliphatic double bonds, and (B) a crosslinking agent in an amount sufficient to crosslink said copolymer on air drying and being selected from the class consisting of the ammonium and amino zirconyl salts of carboxylic acids free of aliphatic unsaturation, in admixture with a monomeric water soluble compound in an amount sufficient to stabilize against coagulation said polymeric material in the presence of said crosslinking agent in solution and being selected from the group consisting of glycine amides, thiourea and hydrazides, the ratio of the total amount of said monoolefinic monomer to the total amount of said copolymerizable hydrophobic material in said copolymer being from about 1:99 to 50:50 mole percent and said copolymer having an average molecular weight of from about 5,000 to 100,000.

15. A film according to claim 14 containing additionally a pigment.

16. An article of manufacture comprising a substrate and a coating on said substrate comprising the reaction product of (A) a water soluble ammonium salt of a copolymer of a mixture of from about 4 to 20 parts by weight of methacrylic acid and the balance at least one acrylate having the formula $CH_2=CR''-COOR'$ where $R'$ is an alkyl group of from 1 to 8 carbon atoms and $R''$ is selected from the group consisting of hydrogen, methyl and ethyl radicals, and (B) ammonium zirconyl carbonate in an amount sufficient to crosslink said copolymer on air drying, in admixture with (C) a monomeric water soluble compound in an amount of from about 5 to 45 parts by weight per 100 parts by weight of said ammonium salt of said copolymer and being selected from the group consisting of glycine, amides, thiourea and hydrazides, said copolymer having an average molecular weight of from about 10,000 to 30,000.

17. An article of manufacture according to claim 16 in which said substrate is a metallic material and in which said coating contains additionally a pigment in an amount of up to 100 parts by weight per 100 parts by weight of said copolymer.

18. An article of manufacture according to claim 17 in which said water soluble compound is urea.

19. An article of manufacture according to claim 17 in which said water soluble compound is thiourea.

20. An article of manufacture according to claim 17 in which said water soluble compound is formamide.

21. The method which comprises depositing on a substrate a composition of an aqueous solution having a pH of from about 5 to 9 and of a polymeric material selected from the group consisting of the ammonium and amine salts and mixtures thereof of a copolymer of at least one monoolefinic monomer having from 1 to 2 COOH groups with at least one copolymerizable hydrophobic material selected from the group consisting of polymers and monomers having polymerizable carbon-to-carbon aliphatic double bonds, a crosslinking agent in an amount sufficient to crosslink said copolymer on air drying and being selected from the class consisting of the ammonium and amino zirconyl salts of carboxylic acids free of aliphatic unsaturation, and a monomeric water soluble compound in an amount sufficient to stabilize against coagulation said polymeric material in the presence of said crosslinking agent and being selected from the group consisting of glycine, amides, thiourea and hydrazides, the ratio of the total amount of said monoolefinic monomer to the amount of said copolymerizable hydrophobic material in said copolymer being from about 1:99 to 50:50 mole percent and said copolymer having an average molecular weight of from about 5,000 to 100,000, and drying said solution to crosslink said copolymer utilizing said crosslinking agent and to form a coating on said substrate.

22. An article of manufacture according to claim 16 in which said substrate is a cellulosic material and in which said coating contains additionally a pigment in an amount of up to 100 parts by weight per 100 parts by weight of said copolymer.

23. An article of manufacture according to claim 16 in which said substrate is a siliceous material and in which said coating contains additionally a pigment in an amount of up to 100 parts by weight per 100 parts by weight of said copolymer.

References Cited in the file of this patent

UNITED STATES PATENTS

| 2,683,699 | Gehring | July 13, 1954 |
| 2,758,102 | Grummit et al. | Aug. 7, 1956 |
| 2,904,526 | Uelzmann | Sept. 15, 1958 |
| 2,917,477 | Suen et al. | Dec. 15, 1959 |

FOREIGN PATENTS

| 738,340 | Great Britain | Oct. 12, 1955 |
| 568,544 | Canada | Jan. 6, 1959 |

UNITED STATES PATENT OFFICE
CERTIFICATE OF CORRECTION

Patent No. 3,079,358                                       February 26, 1963

Heinz Uelzmann

It is hereby certified that error appears in the above numbered patent requiring correction and that the said Letters Patent should read as corrected below.

Column 10, lines 51 to 54, the formula should appear as shown below instead of as in the patent:

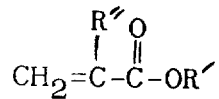

Signed and sealed this 3rd day of December 1963.

(SEAL)
Attest:

ERNEST W. SWIDER                              EDWIN L. REYNOLDS

Attesting Officer                               Acting Commissioner of Patents